Sept. 9, 1941.  H. J. SAUER  2,255,273
COLLISION-PROOF CLEARANCE LAMP FOR VEHICLES
Filed Sept. 14, 1939
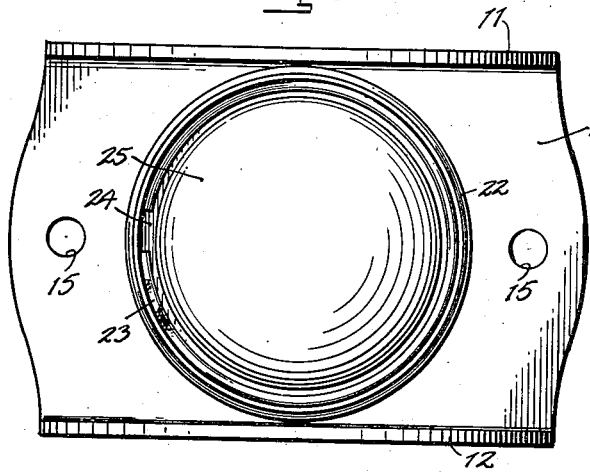
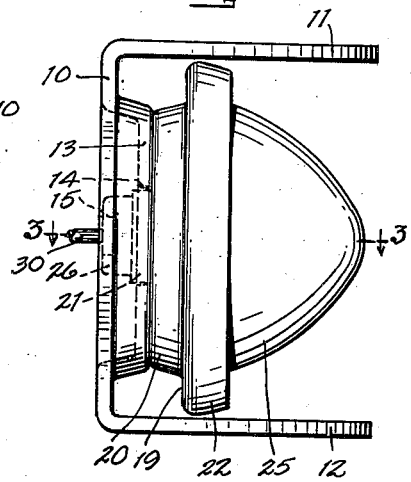
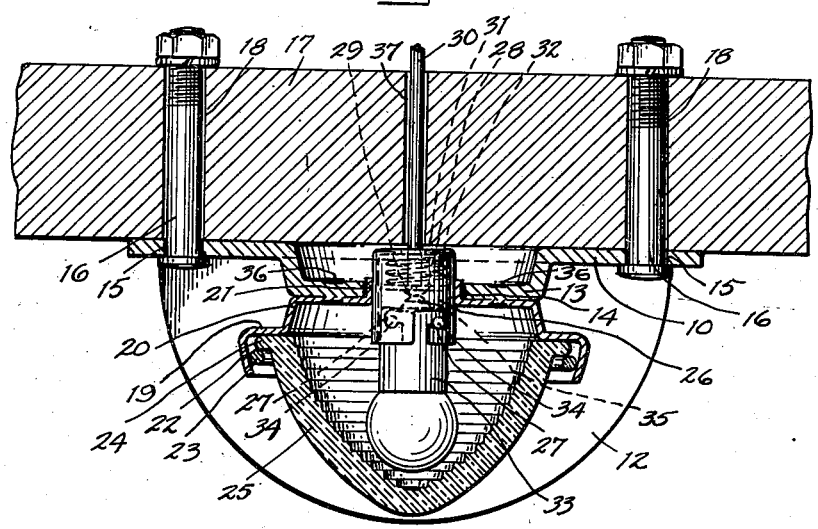
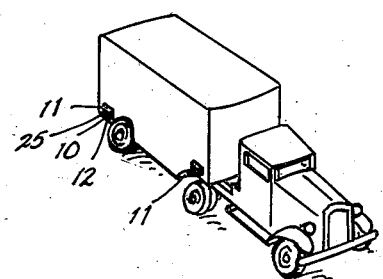
INVENTOR
HENRY J. SAUER.
BY
ATTORNEY Patented Sept. 9, 1941

2,255,273

UNITED STATES PATENT OFFICE 2,255,273

COLLISION-PROOF CLEARANCE LAMP FOR VEHICLES

Henry J. Sauer, Fairfield, Conn., assignor to The Kilborn-Sauer Company, Fairfield, Conn., a corporation of Connecticut Application September 14, 1939, Serial No. 294,830

1 Claim. (Cl. 240—7.1)

The present invention relates to a collision-proof clearance lamp for vehicles, particularly of the type intended to be mounted upon the sides of trucks, busses, trailers, or the like, and which because of their exposed projecting position are unprotected against side swiping. For this reason lamps of this general type have heretofore been constructed in such manner that the lamp itself has been so enclosed in order to protect it that the visibility of the lamp was greatly diminished, and as it is the purpose of such clearance lamps to provide a signal which is visible in all directions, that is, from the front and back, and from the side, these previous structures have not provided a signal which adequately met these requirements.

It is an object of the present invention to provide a clearance lamp in which the lamp proper may be completely exposed without any sacrifice of visibility, and at the same time will be adequately protected against collision. To this end it is proposed to provide a mounting and guard member for the lamp having an intermediate vertically disposed lamp supporting portion adapted to be directly engaged with the side of the vehicle, and having laterally extending guard portions disposed above and below the lamp which will protect the lamp against collision and will be so disposed that in the event that impact with such guard portions distorts them such distortion will not disturb the position or functioning of the lamp.

Another object is to provide a reinforced structure in the lamp support portion of the guard member which will render it rigid, so that it may be constructed of sheet metal without danger of distortion and will also provide a recessed housing for the projecting socket portion of the lamp wherein such socket portion will be out of contact with the side of the vehicle. A further object is to provide a clearance lamp in which the lamp will be fully exposed so that in the event that it is necessary to renew the bulb the lens may be removed and the bulb renewed with facility. A further object is to provide a clearance lamp structure in which the main parts, namely, the mounting bracket and lamp casing may be rigidly assembled by spot welding, thereby greatly simplifying the manufacturing process and providing a structure in which the parts are reliably and permanently connected in rigid relation.

With the above and other objects in view, an embodiment of the invention is shown in the accompanying drawing, and this embodiment will be hereinafter more fully described with reference thereto, and the invention will be finally pointed out in the claim.

In the drawing:

Fig. 1 is a front elevation of a collision-proof clearance lamp, according to the exemplary illustrated embodiment of the invention.

Fig. 2 is a side elevation.

Fig. 3 is a horizontal sectional view, taken along the line 3—3 of Fig. 2, and showing the lamp mounted upon the side of the vehicle.

Fig. 4 is a perspective view of a trailer truck equipped with clearance lamps according to the invention.

Similar reference characters indicate corresponding parts throughout the several figures of the drawing.

Referring to the drawing the clearance lamp, according to the illustrated embodiment of the invention, comprises a lamp mounting and guard member, formed from sheet metal, and consisting of a vertically disposed lamp mounting base 10, and upper and lower laterally disposed guard flanges 11 and 12, these flanges being bent from the base and being substantially semi-circular in shape, so that their projecting edges will oppose impact directed against it from any direction and will deflect such impact. Centrally of the base 10 there is provided an annular outwardly embossed platform portion 13 provided with a central aperture 14, and which portion is adapted to both mount the lamp and provide a socket or recess upon the inner side of the base to receive the projecting socket portion of the lamp, as will presently more fully appear. The embossed portion 13 also reinforces the base 10 rendering it rigid against bending. Near the ends of the base there are provided apertures 15—15, for receiving the attaching bolts 16—16 to secure the bracket to the vehicle body 17, the latter having drilled passages 18—18 to receive the bolts.

The lamp assembly comprises a lamp back or casing 19 having an annular rearwardly embossed offset portion 20 provided with a central lamp socket receiving opening formed by a rearwardly extending cylindrical flange 21. A forwardly projecting inwardly converging rim 22 is formed upon the casing member for the purpose of receiving the split spring retaining ring 23, which engages the base flange 24 of the lens 25 to retain the latter in place, the ring being removable for the purpose of removing the lens and replacing burned out bulbs.

The lamp socket shell 26 is pressed into the cylindrical flange 21 with a force fit to retain it in place, this shell being provided at its inner portion with bayonet slots 27—27, and provided within its outer portion with an insulation disc 28, having a center contact button 29 connected to a conductor wire 30 extending rearwardly through the aperture 31 in the base of the shell, a spring 32 being disposed between the base of the shell and the disc 28. The lamp base 33 provided with diametrically opposed pins 34—34 is engaged in the socket in the usual manner by turning the pins 34 in the bayonet slots 27, the spring 32 yieldably maintaining this connection and also pressing the contact button 29 into firm engagement with the center contact 35 of the lamp base.

The aperature 14 in the platform portion 13 of the lamp mounting base 10 is of such diameter as to receive and position the flange 21 of the lamp back, thus insuring the proper assembly of the lamp with the bracket, the lamp back being thereupon rigidly secured to the platform portion 13 by spot-welding, as at 36. In the assembled relation of the lamp the lens is well within the plan outline of the flanges 11 and 12 so that it is effectually protected against impact in the case of collision with the flanges. The depth of the recess formed by the platform portion 13 is greater than the projection of the shell 32 of the lamp socket, so that the base of the shell is forwardly of the plane of the rearward surface of the base 10, and therefore will be out of contact with the surface of the vehicle thus preventing it from becoming displaced by impact therewith.

The conductor wire 30 is extended through a drilled passage 37 in the vehicle body and is connected to a source of current. This conductor wire supplies current to the center contact of the bulb, the wall of the lamp base 33 being grounded, the ground connection being established through the socket shell 26, the lamp casing 19, the base 10 and the attaching bolt 16, which may be connected in any suitable manner to the ground side of the battery.

I have illustrated and described a preferred and satisfactory embodiment of the invention, but it will be obvious that changes may be made therein, within the spirit and scope thereof, as defined in the appended claim.

Having thus described my invention what I claim and desire to secure by Letters Patent is:

A clearance lamp for vehicles comprising a sheet metal lamp mounting and guard member including a vertically disposed base portion and laterally disposed upper and lower guard portions projecting outwardly from the upper and lower edges of said base portion, said base portion having a forwardly embossed platform portion constituting a shoulder projection upon the outer side of said base portion and a recess upon the inner side, said embossed portion having an aperture, and a lamp assembly including a casing, a socket shell engaged through said aperture and having its rear portion disposed entirely within said recess and said casing engaging said shoulder projection and secured thereto in surrounding relation to said aperture, said embossed portion constituting a reinforcement rendering said sheet metal base portion rigid against bending intermediate its upper and lower edges through bending strains imposed thereon through displacement of said sheet metal guard portions toward each other.

HENRY J. SAUER.